(12) United States Patent
Douglas

(10) Patent No.: US 10,047,537 B2
(45) Date of Patent: Aug. 14, 2018

(54) COMPOSITE SLEEVE ROD AXIAL DAMPENER FOR BUILDINGS AND STRUCTURES

(71) Applicant: Wasatch Composite Analysis LLC, Park City, UT (US)

(72) Inventor: Timothy A. Douglas, Park City, UT (US)

(73) Assignee: WASATCH COMPOSITE ANALYSIS LLC, Park City, UT (US)

(*) Notice: Subject to any disclaimer, the term of this patent is extended or adjusted under 35 U.S.C. 154(b) by 0 days.

(21) Appl. No.: 15/600,376

(22) Filed: May 19, 2017

(65) Prior Publication Data

US 2017/0335588 A1    Nov. 23, 2017

Related U.S. Application Data

(60) Provisional application No. 62/338,849, filed on May 19, 2016.

(51) Int. Cl.
| | |
|---|---|
| *E04H 9/02* | (2006.01) |
| *E04B 1/98* | (2006.01) |
| *E02D 27/34* | (2006.01) |
| *F16F 7/12* | (2006.01) |

(52) U.S. Cl.
CPC ............ *E04H 9/02* (2013.01); *E02D 27/34* (2013.01); *E04B 1/985* (2013.01); *F16F 7/124* (2013.01)

(58) Field of Classification Search
CPC . E04H 9/02; E02D 27/34; E04B 1/985; F16F 7/124
See application file for complete search history.

(56) References Cited

U.S. PATENT DOCUMENTS

| | | | | |
|---|---|---|---|---|
| 4,214,395 | A * | 7/1980 | Caldwell, Jr. | A01K 87/00 124/23.1 |
| 4,451,035 | A * | 5/1984 | Manzi | A63B 21/00043 482/126 |
| 5,454,429 | A | 10/1995 | Neurauter | |
| 7,041,041 | B1 * | 5/2006 | Evans | A63B 21/0004 482/121 |
| 7,243,467 | B2 * | 7/2007 | Peccoraro | E06B 9/02 52/127.2 |
| 7,465,259 | B2 * | 12/2008 | Mok | A63B 21/0004 482/121 |

(Continued)

FOREIGN PATENT DOCUMENTS

| | | | |
|---|---|---|---|
| WO | WO-2015/100497 A1 | 7/2015 | |
| WO | WO 2016167670 A1 * | 10/2016 | E04H 9/02 |

OTHER PUBLICATIONS

International Search Report and Written Opinion for International Application No. PCT/US17/33606 dated Aug. 11, 2017.

*Primary Examiner* — Babajide A Demuren
(74) *Attorney, Agent, or Firm* — Erik Huestis; Foley Hoag LLP

(57) ABSTRACT

Axial buckling restrained braces are provided. In various embodiments, a device comprises a plurality of cylindrical sleeves arranged parallel to each other. Each of the plurality of sleeves has an interior surface defining an interior region. A plastically deformable rod is arranged within the interior region of each of the plurality of sleeves. The plastically deformable rod is adapted to assume a helical shape upon compression.

36 Claims, 14 Drawing Sheets

(56) References Cited

U.S. PATENT DOCUMENTS

| | | | |
|---|---|---|---|
| 7,584,578 B2 * | 9/2009 | Hilmy | E04H 9/02 52/167.1 |
| 8,146,301 B2 | 4/2012 | Bystricky et al. | |
| 9,644,384 B2 | 5/2017 | Powell et al. | |
| 2003/0205008 A1 | 11/2003 | Sridhara | |
| 2005/0037904 A1 * | 2/2005 | Chang | A63B 21/00043 482/122 |
| 2005/0087414 A1 * | 4/2005 | Okimura | E04H 9/02 188/381 |
| 2005/0257490 A1 * | 11/2005 | Pryor | E04H 9/14 52/834 |
| 2005/0274084 A1 * | 12/2005 | Lin | E01D 19/00 52/167.1 |
| 2008/0229683 A1 * | 9/2008 | Bystricky | E04H 9/021 52/167.3 |
| 2010/0192485 A1 | 8/2010 | Sarkisian | |
| 2012/0000147 A1 * | 1/2012 | Chou | E04H 9/02 52/167.1 |
| 2012/0266548 A1 | 10/2012 | Tremblay et al. | |
| 2013/0174501 A1 * | 7/2013 | Michael | F16F 9/303 52/167.1 |

* cited by examiner

COMPOSITE SLEEVE ROD AXIAL DAMPENER FOR BUILDINGS AND STRUCTURES

CROSS-REFERENCE TO RELATED APPLICATIONS

This application claims the benefit of U.S. Provisional Application No. 62/338,849, filed May 19, 2016, which is hereby incorporated by reference in its entirety.

BACKGROUND

Embodiments of the present disclose relate to protecting structures from dynamic loading, and more specifically, to composite sleeve rod axial dampeners for buildings and structures.

When a structural member is excited by a horizontal external force, shear or similar horizontal movement may occur. Shear, especially in high building structures or towers may have serious impact on the conditions of the structure or even result in a collapse.

Dampeners play an important role in the protection of structures, e.g., houses or similar building structures, and they exist in numerous variants. Dampeners may dampen the motion by means of a frictional force between two moving parts attached between structural members of the building or by means of a fluid being forced to flow between two chambers through a restricted tube. Such dampeners act to dampen the seismic, explosion, and wind loading shear, and not an axial cross brace manner. Some dampers are actively changing the dampening effect corresponding to external conditions, and other dampers are passive dampers having a constant dampening characteristic.

An example of a passive dampener is the use of a Buckling Restrained Brace (BRB) which incorporates one or more metallic core or center axial member passing through an exterior buckling-constraining concrete restraint. Such dampeners are heavy, costly to produce, and even more costly to assemble into a structural member of a building. In addition, the BRB dampener result in the metallic core experiencing plastic deformation and strain hardening resulting in permanent set and overall length change to due reacting the large compression and tension loads during a dampening event. The dampening event is a result of the horizontal movement that may occur, e.g., if the foundation of a building is displaced by an earthquake or by similar vibrations transmitted through the ground.

There is, therefore, a need in the art for an improved dampener that will handle these large compression and tension loads that are simpler to manufacture and are lighter weight due to the elimination of cast concrete, and have improved buckling response due to the integration of one or more cylinder of composite materials. Accordingly, the present disclosure provides for dissipating the energy of the seismic, explosion, or wind event by the plastic deformation of one or more circular rods of a metallic core, with the one or more composite cylinder providing the buckling restraint of the metallic rods.

BRIEF SUMMARY

The present application relates generally to a dampener and a method for protecting buildings and similar structural systems from dynamic loading such as loading caused by earthquakes, strong winds or machine vibrations, more specifically, to dampeners constructed of non-metallic materials, with the dampener constructed from structural members interconnected between pinned rotational or welded/bolted joints. These structural members are placed into tension and compression as the dampener is dissipating the energy caused by the earthquake, explosion, strong wind, or machine vibration. Due to the dampening of the joints, relative movement between the structural elements is dampened. In particular, the dampener is useful for base isolation, e.g., in order to allow a building or a machine to move in dampened movements relative to its foundation.

It is an object of the present disclosure to provide a dampener for dampening substantially horizontal movement or shear in structures such as shear in buildings. The present disclosure provides a dampening device that is constructed of cylindrical metallic rods and external composite buckling restraining cylinders, which are located between two end fittings pinned, bolted, or welded to the horizontal and vertical members of the building or structure.

In various embodiments, a seismic axial dampener device is constructed of a multitude of metallic rods and a composite cylindrical restraint sleeves forming an exo-structure capable of dampening both tension and compression cycles of a building structure due to a seismic, explosion, or wind event. The dampener reacts and dampens the loading in both tension and compression and adequately protects the plastically deforming rods from local and global buckling.

According to embodiments of the present disclosure, axial dampening device is provided. The device comprises a plurality of cylindrical sleeves arranged parallel to each other. Each of the plurality of sleeves has an interior surface defining an interior region. A plastically deformable rod is arranged within the interior region of each of the plurality of sleeves. The plastically deformable rod is adapted to assume a helical shape upon compression.

In some embodiments, the surface of the interior region of each of the plurality of sleeves has a coefficient of friction of about 0.06 to about 0.45. In some embodiments, the surface of the interior region of each of the plurality of sleeves comprises a polymer liner. In some embodiments, each of the plurality of cylindrical sleeves is substantially fixed to each other of the plurality of cylindrical sleeves. In some embodiments, each of the plurality of cylindrical sleeves is fixed by stiffeners. In some embodiments, the plurality of cylindrical sleeves is overwrapped. In some embodiments, the overwrap comprises fiberglass cloth. In some embodiments, the overwrap comprises epoxy resin. In some embodiments, the stiffeners are substantially evenly spaced along the length of the plurality of cylindrical sleeves.

In some embodiments, the device includes an end plate, the plurality of cylindrical sleeves being fixed to the end plate at a first end. In some embodiments, the device is adapted to allow free motion of the plurality of sleeves relative to the rods at an end opposite the end plate. In some embodiments, the end plate is adapted to be fixed to a building.

In some embodiments, the device includes a stiffening member disposed substantially parallel to the plurality of cylindrical sleeves and fixed to the end plate, each rod being connected to the stiffening member. In some embodiments, the stiffening member has a substantially cruciform cross-section. In some embodiments, the stiffening member is adapted to substantially prevent yielding of the rods where attached thereto during compression. In some embodiments, each of the plurality of cylindrical sleeves has a slot therein, adapted to allow relative coaxial motion between the plurality of cylindrical sleeves and rods without obstruction by the stiffening member.

In some embodiments, the plurality of cylindrical sleeves has a stiffness (EI) of about $1.7 \times 10^8$ to about $2.0 \times 10^6$ lb-in$^2$.

In some embodiments, the device does not include a concrete exoskeleton.

In some embodiments, the device does not include a metal exoskeleton.

In some embodiments, the plurality of cylindrical sleeves numbers from 2 to 10.

According to embodiments of the present disclosure, a method of bracing a structure is provided. The method includes affixing thereto a device as described above.

DETAILED DESCRIPTION

Figure 1:
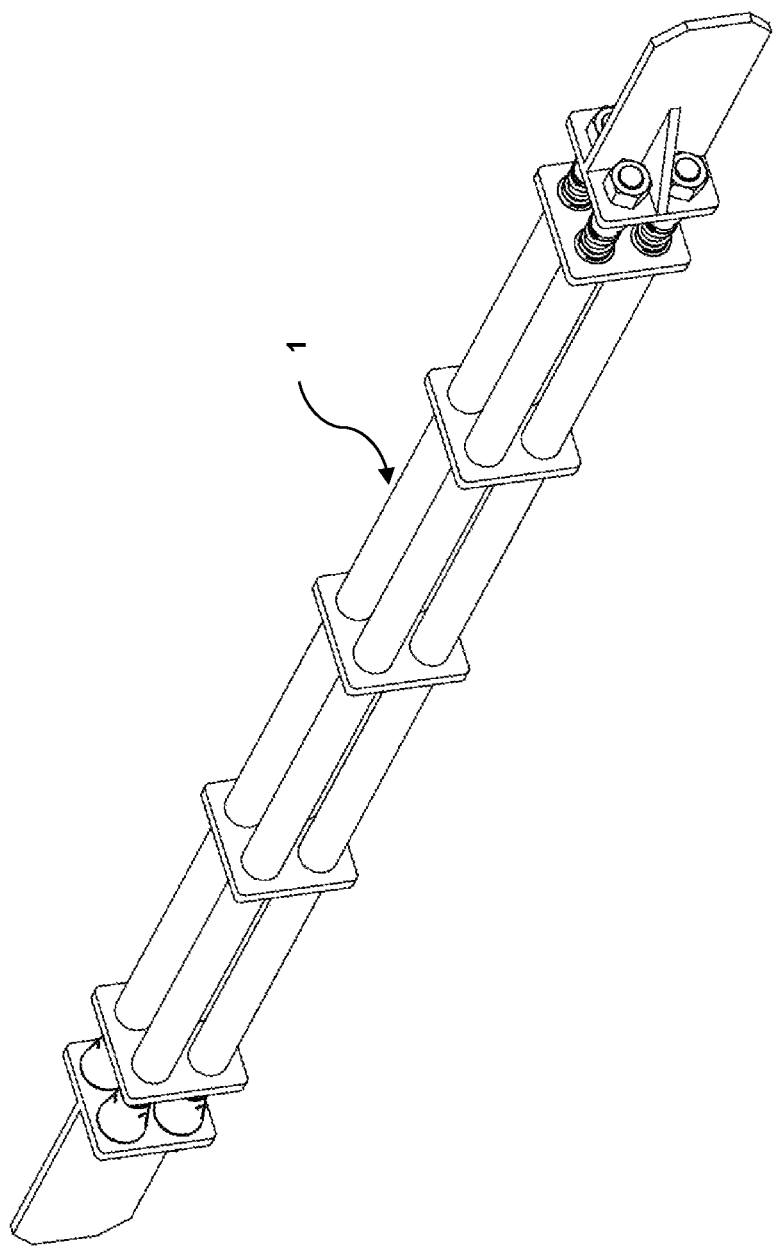
FIG. 1 depicts a composite sleeve rod axial dampener for buildings and structures according to embodiments of the present disclosure.
Figure 2A:
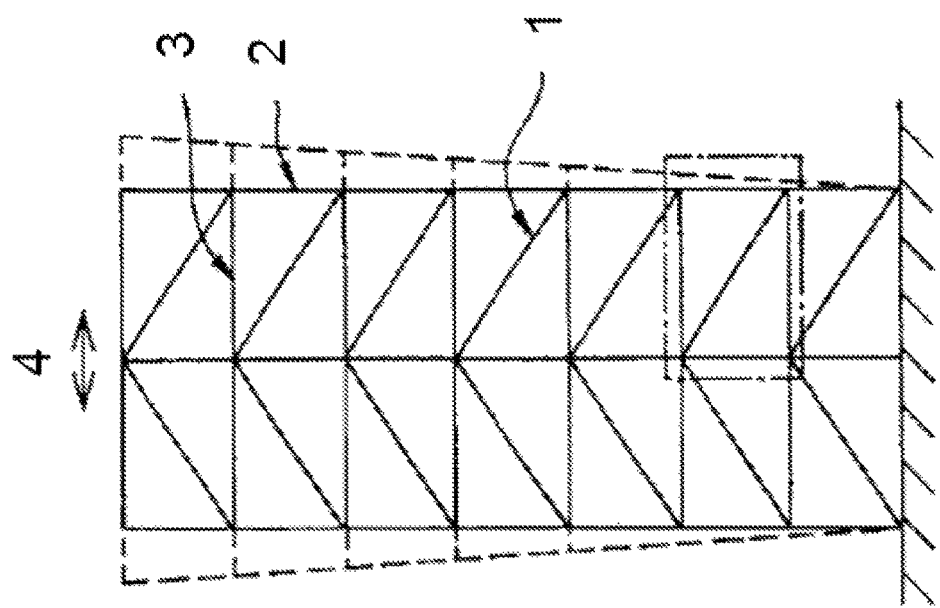
FIGS. 2A-D illustrates integration of composite sleeve rod axial dampeners into a multi-floor building according to embodiments of the present disclosure.
Figure 2B:
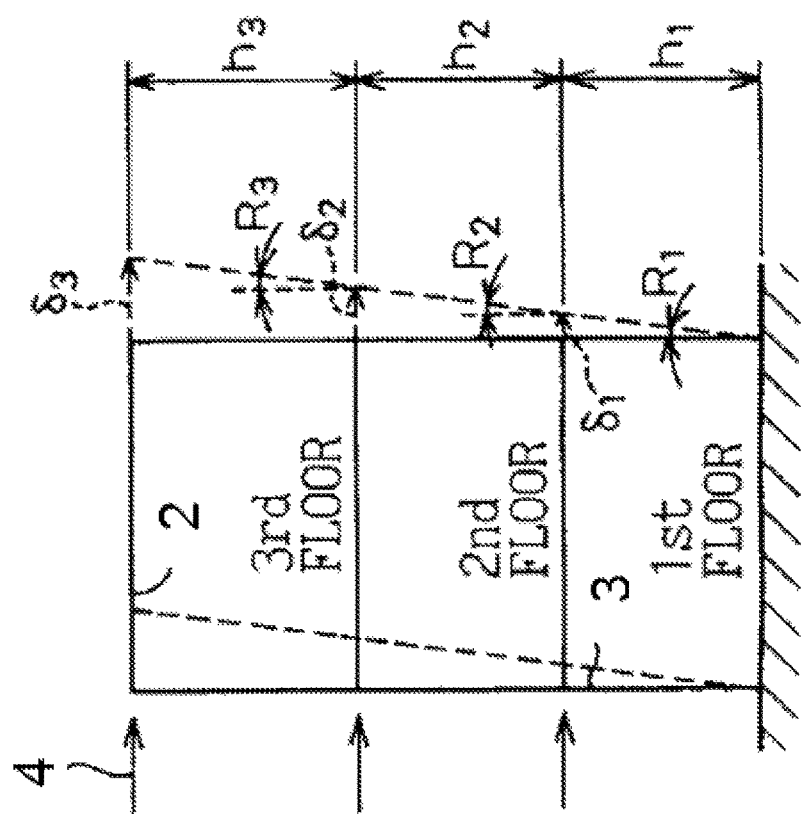
Figure 2C:
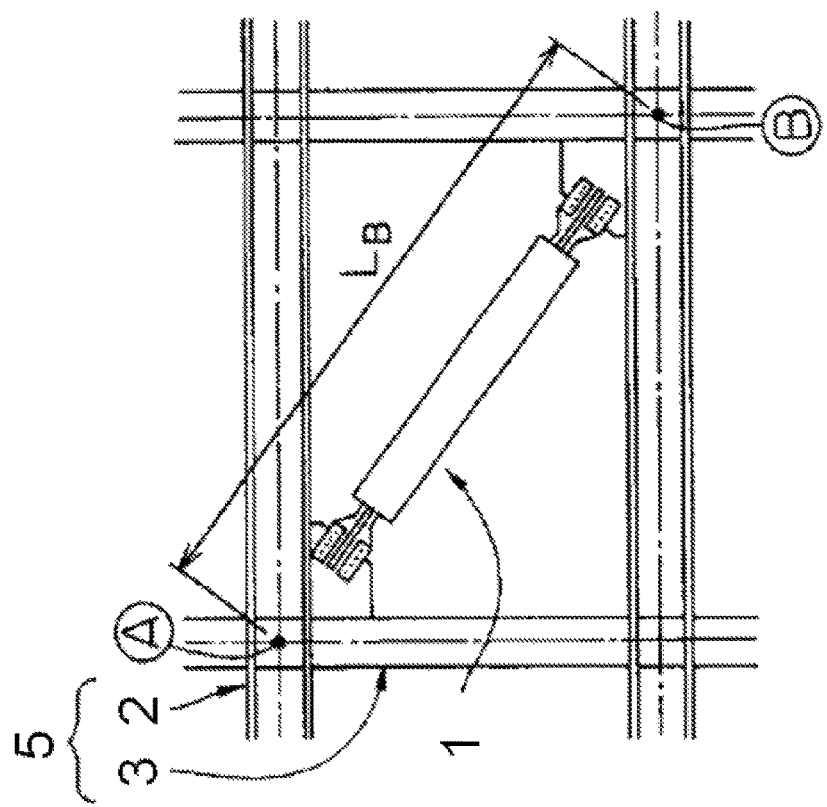
Figure 2D:
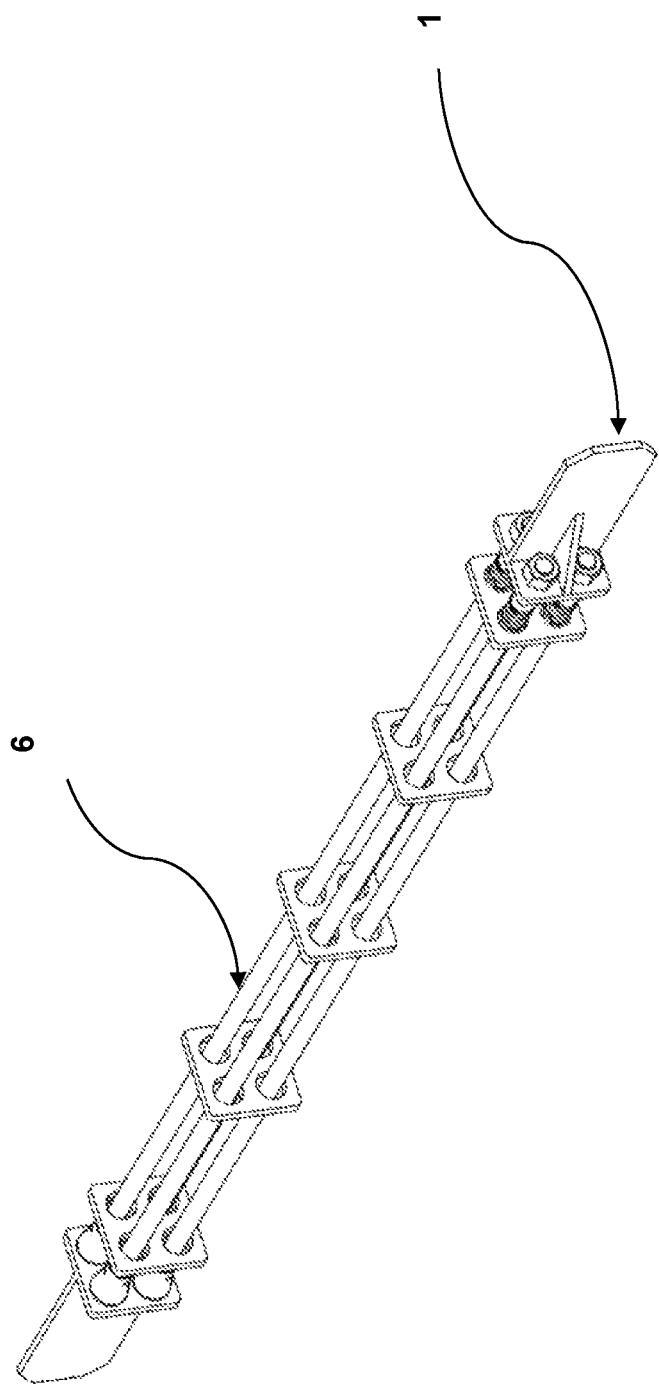

For a more complete understanding of the present disclosure and its advantages, reference is now made to the following description taken in conjunction with the accompanying drawings, in which like reference numerals represent like parts. The various embodiments disclosed herein are by way of illustration only and should not be construed in any way to limit the scope of the disclosure. Those skilled in the art will understand that the principles of the present disclosure may be implemented in any suitably arranged composite cylinder rod dampener that dampens substantially horizontal movement or shear in structures such as shear in buildings. As disclosed herein, the notational representation of cross sectional geometry presented is not intended to limit the number of rods or diameters thereof in embodiments of the present disclosure.

FIG. 1 is an isometric view of a cylindrical composite/metallic rod dampener according to an exemplary embodiment of the present disclosure. Composite/metallic rod dampener 1 is constructed of composite and metallic materials and is integrated into a building structure to dampen the energy of a loading event.

FIG. 2 illustrates how a multiplicity of composite cylinder and metallic rod dampener 1 braces are integrated into a building in order to react the ground induced lateral seismic, explosion, and wind loading. The dampener (shown in FIG. 2D), fitted with end connections, spans the diagonal distance between the corners of the horizontal 2 and vertical 3 structural members of the each building floor, as shown in FIG. 2A. As the foundation of the building oscillates from the cyclic loading, a reaction force 4 is generated at each floor level, with the displacement increasing as one moves up the structure, illustrated by FIG. 2B. The brace end connections are bolted, pinned, or welded to the intersection 5 of the horizontal 2 and vertical 3 building structural members in FIG. 2C. The distance between Point A and Point B is considered the brace length ($L_B$), and the expansion and contraction forces and displacements of this link in the structure are dampened by the cylindrical rod dampening brace 1 as the building distorts about Points A and B. The energy of this seismic, explosion, or wind motion is dissipated and absorbed by the cylindrical rods 6 (FIG. 2D, composite restraint cylinders not shown for clarity) internal to the dampener 1, thus resulting in the dampening of the entire building structure, which will maintain the build integrity and allow the structure to survive the loading event.

Figure 3A:
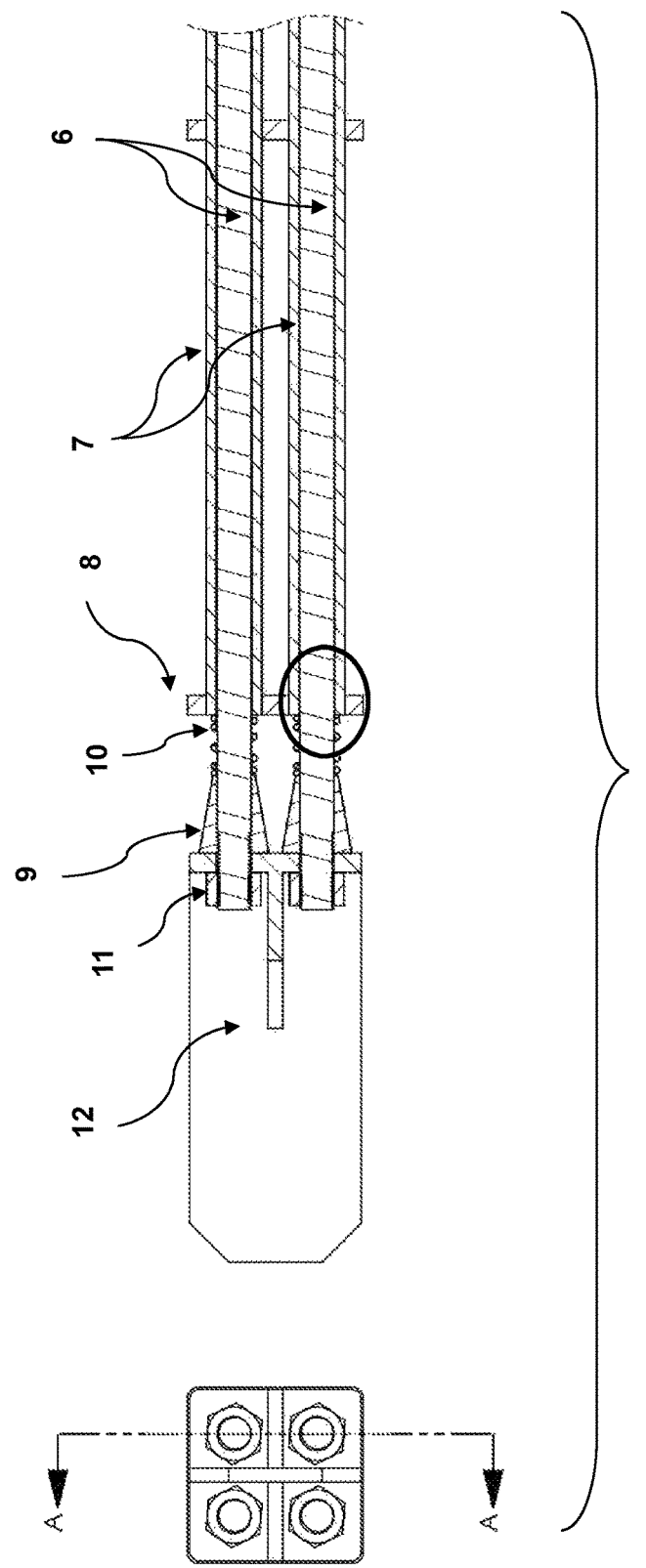
FIG. 3A depicts a section view of composite sleeve rod axial dampener for buildings and structures according to embodiments of the present disclosure.

FIG. 3 shows the internal structures and details of a cylinder rod dampener 1. This embodiment includes a parallel set of four metallic rods 6 which deform plastically in a helix shape during a compression cycle, and then straighten during a tensile cycle. In some embodiments, metallic rods 6 are steel.

In some embodiments, the composite restraint cylinders are manufactured from a combination of carbon, aramid, or glass fibers within a polymer resin matrix constituting the composite material. These restraint cylinders are not limited to composite materials, but may also be fabricated from metallic materials. The rods 6 are assembled inside the composite restraining cylinders 7 in a parallel configuration. The internal liner of the composite cylinder is manufactured from a low friction polymer to reduce the friction forces generated during compression cycles improving the performance of the rod cores.

The composite local buckling restraining cylinders 7 react the normal buckling restraining side forces generated by the formation of the rod helix under axial compression loading. This embodiment includes a Critical Buckling Gap to allow the rod to freely expand as the compression load is applied. A detail of the Critical Buckling Gap (circled) is provided in the Section A-A view of FIG. 3B. A series of five global buckling support frames 8 are evenly spaced down the length of the composite restraining cylinders. Located at the end of each rod is a conical compression collar 9 threaded into the rod, and an alignment spring 10 to center the restraining cylinders as the load transitions between compression and tension. A tension nut 11 is threaded into the end of the rod clamping the rods to the end fittings 12. These end fitting can be bolted or pin to the building or structure to react the energy of this seismic, explosion, or wind motion.

The dampener and brace design with its ease of assembly, variability of rod dimensions and cross sectional contours, and thickness affords extensive tailorability of the present disclosure to react the various tension and compression loadings for each floor of the building.

Figure 3B:
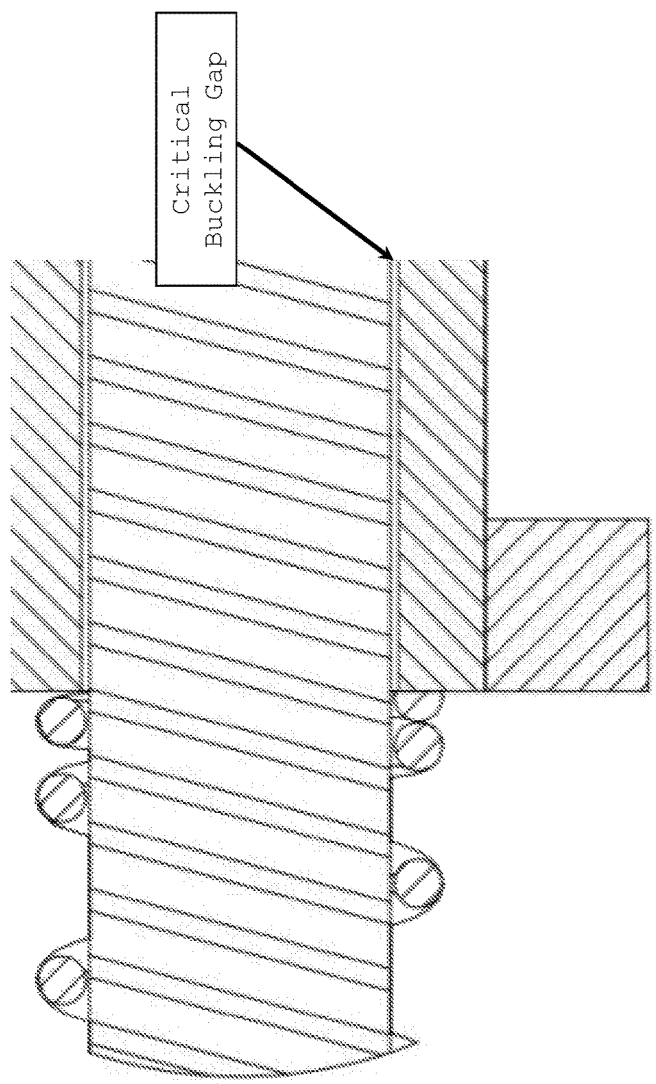
FIG. 3B depicts a detail view of a critical buckling gap of the composite sleeve rod axial dampener of FIG. 3A.

As a compression cycle begins, the rods 6 compress until a buckling helix is formed, restrained by the composite cylinder 7. As shown in FIG. 3B, the present disclosure provides a Critical Buckling Gap between the rod 6 and the restraining cylinder 7. This gap allows for the free radial expansion of the rod due to Poisson's effect under compression loading. The energy necessary to compress the rods is absorbed by the bending of each individual rod, which is plastically deformed. The rods are design so that the material does experience plastic deformation.

The present dampener is capable of resisting the induced bending moment and beam shear load from the bolted or welded brace attachments to corner or intersection of the horizontal and vertical members of the building structure.

Various embodiments react the compression loading into the rods through the conical compression collar 9 threaded into the rod 6. The tapered cross-section of the compression collar allows for the compression load to be introduced into the rod without aggravating the buckling at the rod end. Since devices according to the present disclosure under compression forms a helix inside the composite buckling restraining cylinder, the normal buckling restraining side-forces are significantly reduced. In addition to the reduced restraining force magnitude, the helix buckling shape evenly changes the direction and distributes the restraining force linearly around the interior circumference of the restraining cylinder, as the helix moves up and down the cylinder during loading. This results in an equal and opposite force acting on the restraining cylinder, which eliminates the larger directional force seen in the current BRB art affecting the global buckling response of the full BRB column. Therefore, devices according to the present disclosure are not required to have a structural steel sleeve to react these global buckling loads, resulting in significant weight and cost savings. Instead, a series of five global buckling support frames 8 are evenly spaced down the length of the composite restraining cylinders.

Figure 4:
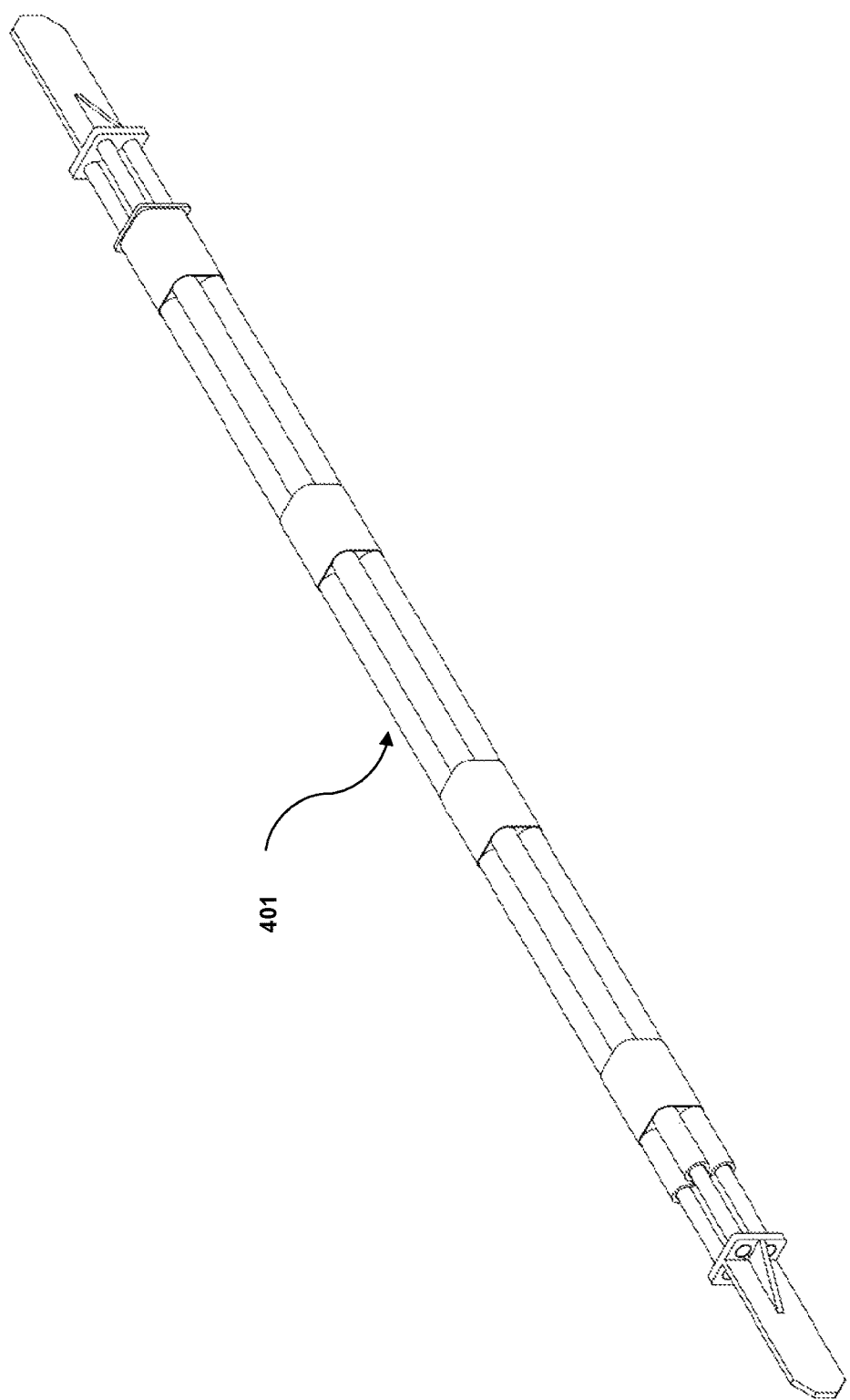
FIG. 4 depicts a composite sleeve rod axial dampener for buildings and structures according to embodiments of the present disclosure.

Referring now to FIG. 4, a composite sleeve rod axial dampener according to embodiments of the present disclosure is illustrated. Composite/metallic rod dampener 401 brace is constructed of composite and metallic materials and is integrated into a building structure to dampen the energy of a loading event.

Composite cylinders or sleeves, due to their concentric design to the rods, provides for a consistent plastic deformation gap allowing for the yielding of the rods during a seismic event as the circular rod forms a localized buckling helix shape. In some embodiments, the composite sleeves are bonded to each other, allowing the superstructure of the brace to resist the overall global buckling mode. Accordingly, no exoskeleton of concrete or metal is necessary in the operation of the BRB, substantially reducing the weight, complexity, and cost of the brace.

In some buckling restrained braces, the single rod BRB design incorporates an outer metal shell that can be filled with concrete, or incorporates a series of supporting spacers between the outer shell and the restraint sleeve, to react the global brace buckling.

In some embodiments, the composite restraint cylinders are bonded to each other and overwrapped with composite materials at multiple locations down the length of the brace. This bonded arrangement of the parallel restraint cylinders allows the joined sleeves to react the brace global buckling. In the present disclosure, the outer exoskeleton of either a shell filled with concrete or a metallic structural lattice can be eliminated from the BRB, substantially reducing the weight, complexity, and cost of the brace.

Figure 5:
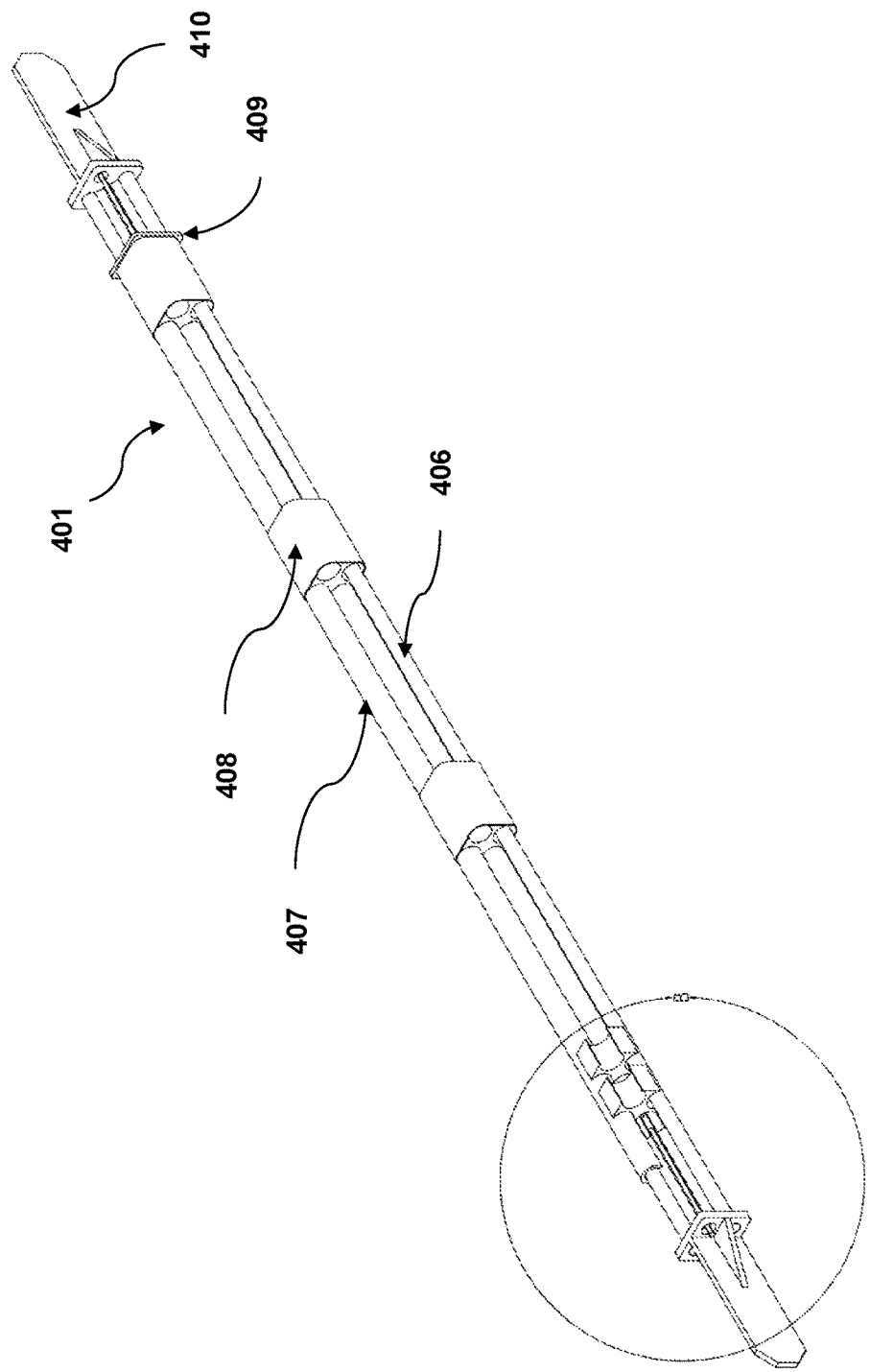
FIG. 5 is an isometric view of the device of FIG. 4, with the removal of a rod, two composite sleeves, and an overwrap for clarity.
Figure 6:
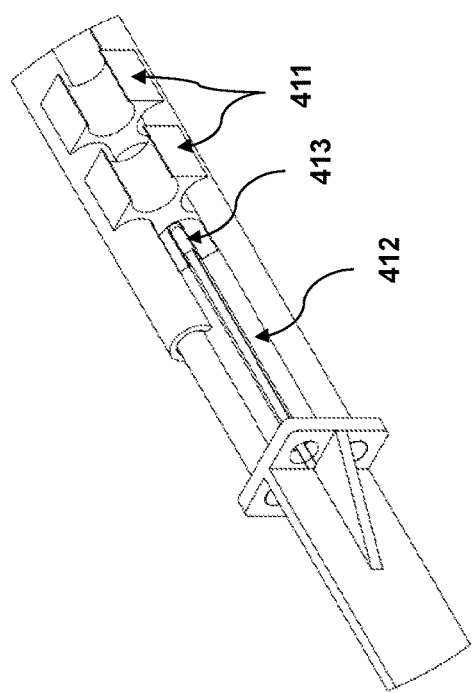
FIG. 6 is a detail view of the device of FIG. 4, with the removal of a rod, two composite sleeves, and an overwrap for clarity.

FIGS. 5-6 illustrates a composite sleeve rod axial dampener in isometric and detail views. As discussed above, with regard to FIGS. 2A-D, a multiplicity of parallel and concentric composite cylinder and metallic rod dampener braces may be integrated into a building in order to react the ground induced lateral seismic, explosion, and wind loading. The energy of this seismic, explosion, or wind motion is dissipated and absorbed by the cylindrical rods 406 internal to the dampener 401, thus resulting in the dampening of the entire building structure, which will maintain the build integrity and allow the structure to survive the loading event. In these figures, some composite restraint cylinders, a rod, and one overwrap are not shown for clarity.

FIGS. 5-6 show internal structures and details of the device of FIG. 4, including the parallel composite restraint sleeves 407; several composite overwraps 408 structurally bonding the sleeves at multiple locations down the length of the brace 401; an end plate 409 bonded to the pack of overwrapped sleeves and welded to the cross stiffener 412 located in the two non-yielding regions of the brace 401, which is in turn welded to the end fittings 410. In FIG. 6, plastic stiffeners 411, are bonded to the parallel sleeves 407, and then overwrapped with composite cloth 408.

Figure 7:
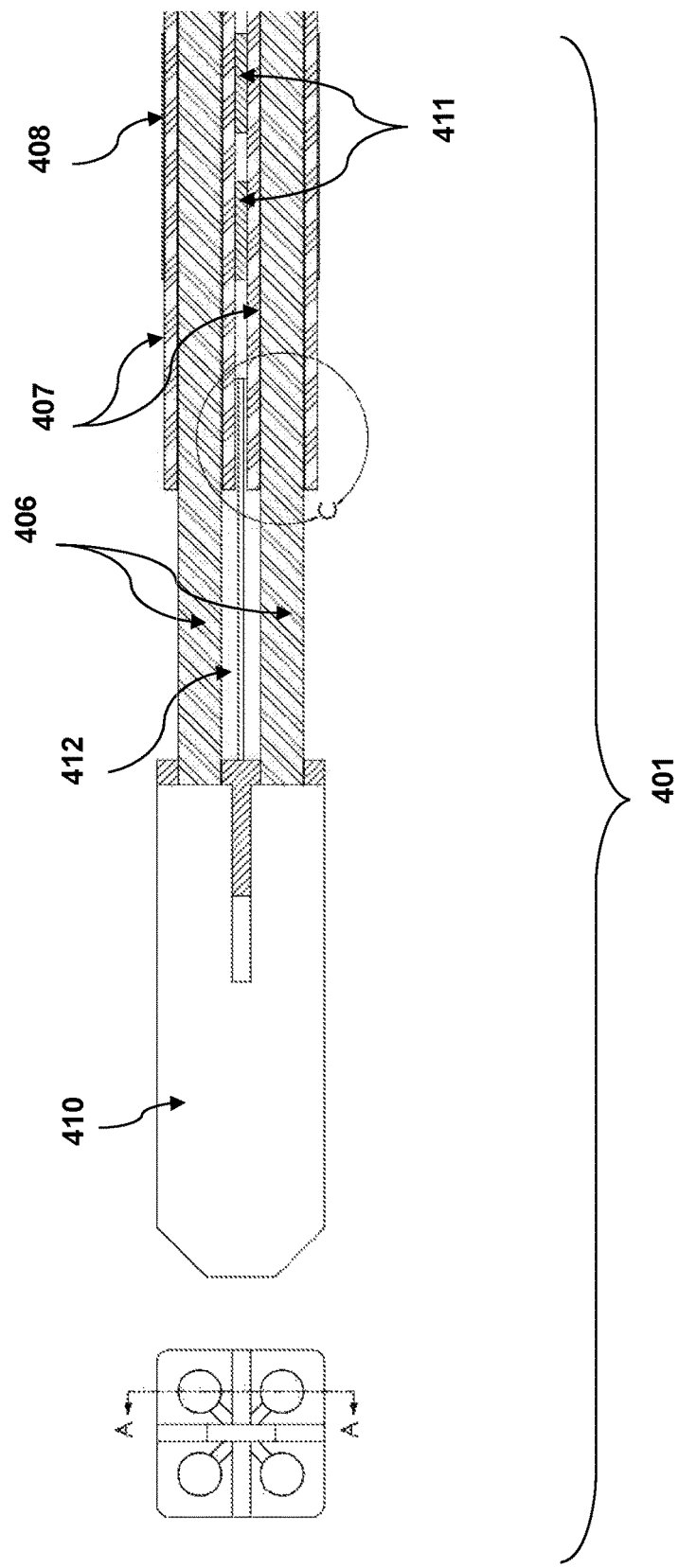
FIG. 7 depicts a section view of composite sleeve rod axial dampener for buildings and structures according to embodiments of the present disclosure.
Figure 8:
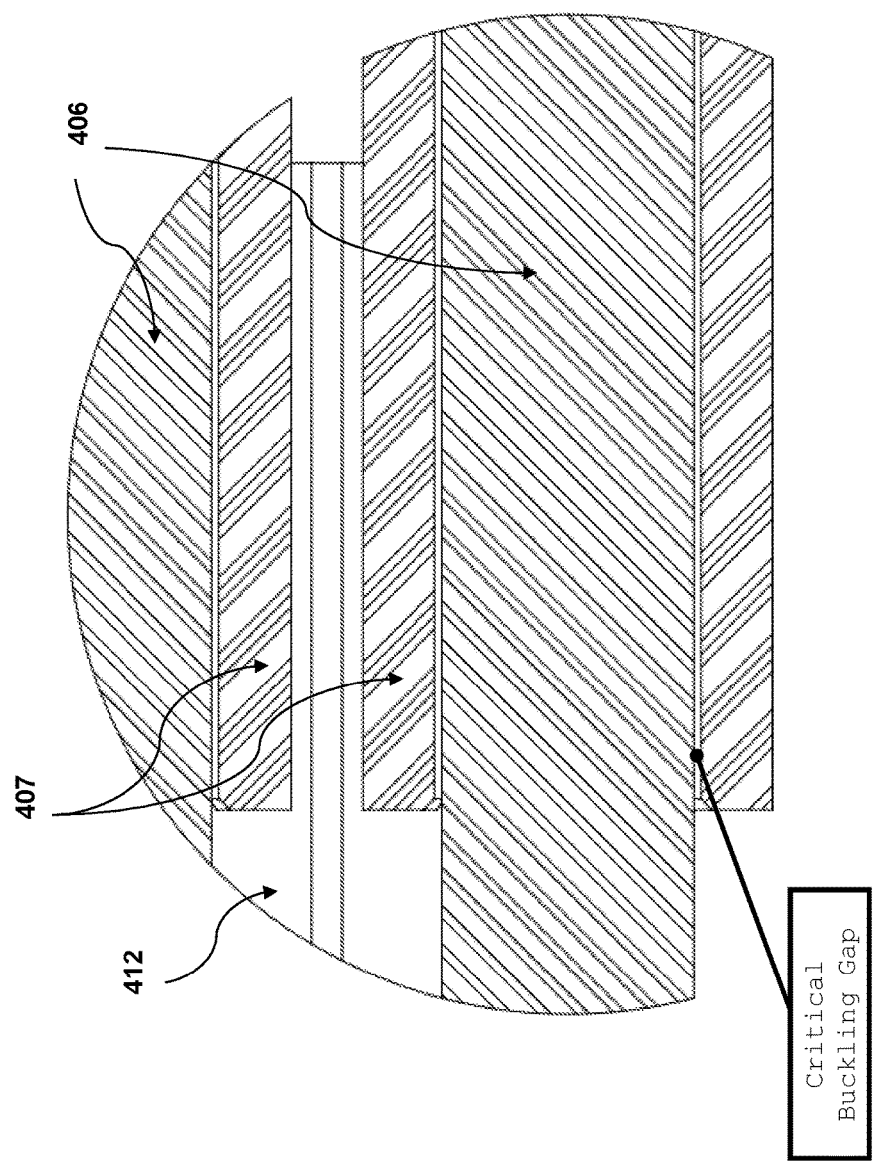
FIG. 8 depicts a detail view of a critical buckling gap of the composite sleeve rod axial dampener of FIG. 7A.

The cross stiffener 412 is welded to each of the parallel rods 406 providing stiffening of the rods so no yielding occurs in these two regions of the brace 401. In some embodiments, cross-stiffener 412 has a cruciform cross-section, and is fixed to the rods along its outer edges. Slot 413 is machined into each composite sleeve only on one end of the sleeve as shown in FIG. 6. This slot provides clearance for the cross stiffener 412 to freely move past the send of the parallel sleeves 407 during a BRB compression cycle. During a BRB tension cycle, the length of cross stiffener 412 is such that stiffener remains inside the sleeve slot 413 so the plastically deforming region on the rods 406 are never unsupported as the BRB returns to a compression cycle. There are no slot features machined into the composite sleeves on the right end of the brace, since the pack of parallel sleeves is bonded to end plate 409. Therefore, the entire composite sleeve pack freely moves with the right end fitting 410. In some embodiments, the cross-stiffener is about 7 inches in length. In some such embodiments, the slot 413 is about 8.5 inches in length in order to accommodate sliding of the FIGS. 7-8 shows the internal structures and details of a cylinder rod dampener 401. This embodiment includes a parallel set of four metallic rods 406 which deform plastically in a helix shape during a compression cycle, and then straighten during a tensile cycle. In some embodiments, metallic rods 406 are steel.

In some embodiments, the composite restraint cylinders are manufactured from a combination of carbon, aramid, or glass fibers within a polymer resin matrix constituting the composite material. These restraint cylinders are not limited to composite materials, but may also be fabricated from metallic materials. The rods 406 are assembled inside the composite restraining cylinders 407 in a parallel configuration. The internal liner of the composite cylinder is manufactured from a low friction polymer to reduce the friction forces generated during compression cycles improving the performance of the rod cores.

The composite local buckling restraining cylinders 407 react the normal buckling restraining side forces generated by the formation of the rod helix under axial compression loading. This embodiment includes a Critical Buckling Gap to allow the rod to freely expand as the compression load is applied. A detail of the Critical Buckling Gap (circled) is provided in the Section A-A view of FIG. 8. A series of global buckling plastic stiffeners 411, which are over-wrapped with composite cloth 409, are evenly spaced down the length of the composite restraining cylinders. End fitting 410 can be bolted or pin to the building or structure to react the energy of this seismic, explosion, or wind motion.

The dampener and brace design with its ease of assembly, variability of rod dimensions and cross sectional contours, and thickness affords extensive tailorability of the present disclosure to react the various tension and compression loadings for each floor of the building.

As a compression cycle begins, the rods 406 compress until a buckling helix is formed, restrained by the composite cylinder 407. As shown in FIG. 8, the present disclosure provides a Critical Buckling Gap between the rod 406 and the restraining cylinder 407. This gap allows for the free radial expansion of the rod due to Poisson's effect under compression loading. The energy necessary to compress the rods is absorbed by the bending of each individual rod, which is plastically deformed. The rods are design so that the material does experience plastic deformation.

The present dampener is capable of resisting the induced bending moment and beam shear load from the bolted or welded brace attachments to corner or intersection of the horizontal and vertical members of the building structure.

Various embodiments react the compression loading into the rods through the non-yielding region of the rod 406, internally supported by 7 the cross-stiffener 412. Since device according to the present disclosure under compression forms a helix inside the composite buckling restraining cylinder, the normal buckling restraining side-forces are significantly reduced. In addition to the reduced restraining force magnitude, the helix buckling shape evenly changes the direction and distributes the restraining force linearly around the interior circumference of the restraining cylinder, as the helix moves up and down the cylinder during loading. This results in an equal and opposite force acting on the restraining cylinder, which eliminates the larger directional force seen in the current BRB art affecting the global buckling response of the full BRB column. Therefore, devices according to the present disclosure are not required to have a structural steel sleeve to react these global buckling loads, resulting in significant weight and cost savings. Instead, a series of global plastic stiffeners 411 bonded to the composite sleeves 407, and overwrapped with composite cloth 408, are evenly spaced down the length of the composite restraining cylinders.

Figure 9:
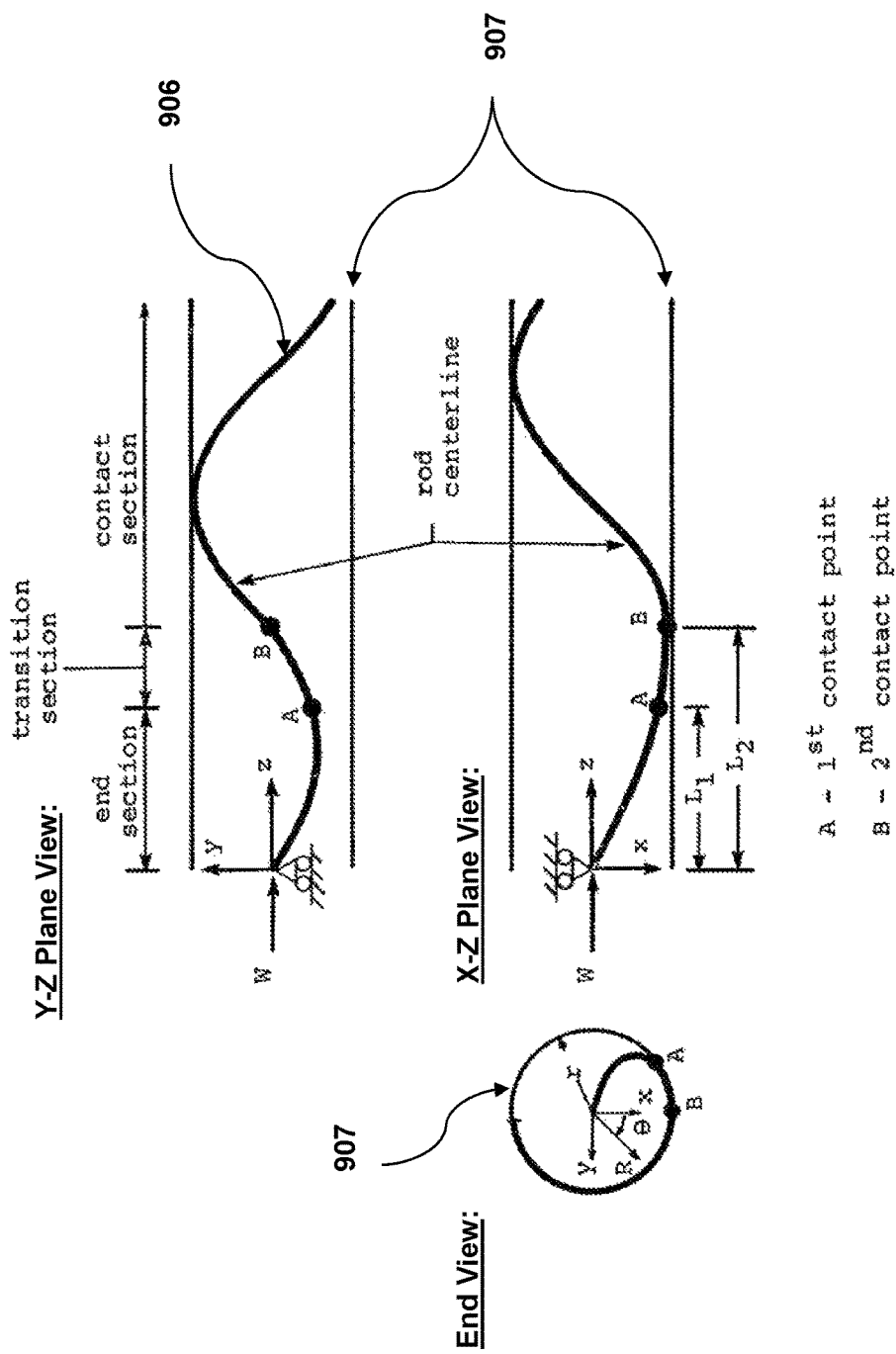
FIG. 9 depicts helix buckling shapes for buckling restrained braces (BRB) according to embodiments of the present disclosure.

FIG. 9 illustrates the helix shape formed by a rod 906 under compression loading as it contracts a composite restraining cylinder 907 shown in cross-section. During a tension cycle, the end fittings 911 (e.g., tension nuts) pull the rods 906 into tension, removing the helix shape.

Calculations of the helix shaped formed for a rod under compression loading show that the rod will first contact the outer wall in two locations A and B. At point B, the rod fully contacts the internal composite cylinder wall following the circumference of the cylinder in shape of a helix whose pitch is constantly changing as more or less compression load is applied to the end of the rods.

Figure 10:
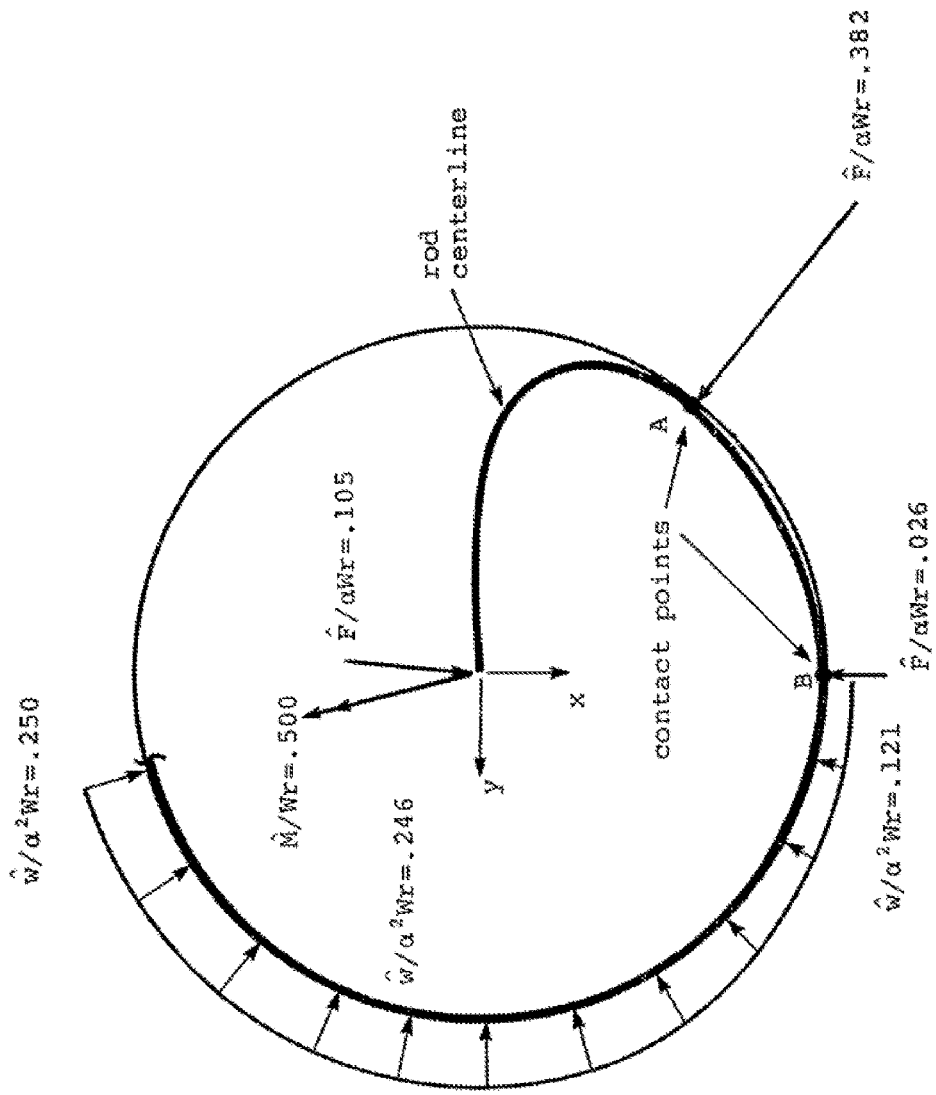
FIG. 10 depicts restraining cylinder reaction forces generated during buckling according to embodiments of the present disclosure.

FIG. 10 illustrates the composite restraining cylinder reaction forces generated when the core rod is loading in compression and the buckling helix is formed. The forces at point A and B are point loads normal to the cylinder wall, while the force in the region of the helix contacting the wall is a line load, given in pounds per inch.

To calculate the reaction forces on the restraining cylinder, alpha ($\alpha$) is computed as shown in Equation 1. The $\alpha$ parameter, with the units of 1/length, describes the relationship between the applied compression load (W) and the rod stiffens (EI); where E is the rod Modulus, and I is the rod cross-sectional inertia. From $\alpha$, several of the reaction forces down the length of the restraining cylinder are calculated, beginning with the reaction at the fixed end condition continuing on to the full contact helix section of the rod. Forces are calculated at various location down the cylinder as shown in Equation 2 through Equation 5, where r is the radial gap between the rod outside diameter and the inside diameter of the restraining cylinder. $F_{end}$ is the Fixed-end Force [lbf]. $F_A$ is the Point A Force [lbf]. $F_B$ is the Point B Force [lbf]. $F_H$ is the Helix Force [lbf/in]. Each of these reaction forces are shown in FIG. 5.

$$\alpha = \sqrt{\frac{W}{EI}} \qquad \text{Equation 1}$$

$$F_{end} = 0.19187 * \alpha W r \qquad \text{Equation 2}$$

$$F_A = 0.38202 * \alpha W r \qquad \text{Equation 3}$$

$$F_B = 0.02557 * \alpha W r \qquad \text{Equation 4}$$

$$F_H = 0.25 * \alpha^2 W r \qquad \text{Equation 5}$$

As shown, the buckling mode shape for these cylindrical rods is helical in nature, which significantly differs from a Buckling Restrained Brace (BRB) with a rectangular core that produces a sine waveform. A helix inside the composite buckling restraining cylinder of the present disclosure significantly reduces the normal buckling restraining side forces as compared to sine waveform restraining forces. In addition to the reduced restraining force magnitude, the helix buckling shape evenly changes the direction and distributes the restraining force linearly around the interior circumference of the restraining cylinder, as the helix moves up and down the cylinder during loading. This results in an equal and opposite force acting on the restraining cylinder, which eliminates the larger directional force seen in a BRB affecting the global buckling response of the full BRB column. Thus, embodiments of the present disclosure do not require a structural steel sleeve to react these global buckling loads, resulting in significant weight and cost savings.

According to embodiments of the present disclosure, an axial dampening device comprising a body constructed of composite, non-metallic and metallic materials, capable of dampening building structural seismic, explosion, or wind loads and displacements through plastic deformation of the rods. In some embodiments, a set of rods is included that form a helix shape as the rods are reacting a compression load while being restrained by a composite restraining cylinder.

In some embodiments, an axial dampening device is manufactured from lightweight composite materials. In such embodiments, energy dampening is provided within the building without the need for a heavy weight, concrete filled, buckling restrained brace cylindrical restraint collar or column. The integration of composite materials and elimination of the cylindrical restraint cylinder provides substantial weight savings, resulting in significant transportation and handling cost savings. Accordingly, the installation cost of retrofitting existing buildings to meet updated seismic codes is reduced.

Some embodiments include an assembled critical buckling gap between a rod and a composite restraint cylinder. In some such embodiments, this gap is filled with lubricant to reduce frictional forces generated during helix compression cycles.

In some embodiments, a composite restraining cylinder internal wall comprises a low-friction polymer liner to reduce the friction forces produced during compression cycles.

According to embodiments of the present disclosure, an axial buckling restraint brace device is provided. The device includes a plurality of yielding rods parallel to each other. A plurality of cylindrical sleeves is arranged parallel to each other and concentric to the rods, surrounding a majority of the rods. Each of the plurality of sleeves has an interior low friction polymer linear. A plurality of plastically deformable rods is arranged within the interior region of each of the plurality of sleeves and adapted to assume a helical shape upon compression.

In some embodiments, the cylindrical sleeves are bonded to each other using plastic stiffeners and overwrapped composite/epoxy cloth evenly spaced down the length of the brace creating a structural package of composite restraint sleeves.

In some embodiments, two non-yielding brace regions are supported by a cross stiffener welded between each rod on both ends of the brace, and welded to the end fittings bolted to the building. The structural package of composite restraint sleeves bonded on one end to an end plate allow free motion of the sleeves relative to the rods at the free end. A machined slot in each sleeve allows free motion of the cross stiffener within the non-yielding region to pass through the composite restraint sleeves in a compression cycle and still provide full length buckling support of the rod's plastically deforming region during a tension cycle.

In some embodiments, the structural package of buckling restraint sleeves is significantly stiff to react global brace buckling without the need for an exoskeleton of concrete or metal.

In some embodiments, the number of rods employed is between 2 to 10. However, it will be appreciated that various numbers of rods are suitable for use according to the present disclosure. Likewise, varying rod cross-sectional diameters are suitable for use according to the present disclosure. Either an odd or even number of rods may be used, with a mix of various cross-sectional diameters. The variation in number of rods and diameters provide simple scalability to changing building load requirements from floor to floor.

In some embodiments, the structural package of buckling restraint sleeves is bonded on one end to a bonding plated welded to the non-yielding region of the brace. The package is allowed to freely move axially along the parallel rods, forcing the rods to form a helix shape during compression.

In some embodiments, the machined slots are sized such that free axial movement of the rods is not impinged while providing full length local buckling support at the start of a seismic compression cycle.

The critical buckling gap is formed by the concentricity of the outside diameter of the rod and the inside diameter of the composite polymer lined sleeve. No material is required to separate or release the rod from the buckling restraint sleeve.

It will be appreciated that various polymers are suitable for use according to the present disclosure. Such polymers include, without limitation, PTFE Polytetrafluoroethylene, PE Polyethylene, Nylon, PETP Polyester, PAI Polyamide-imide, PEEK Polyetheretherketone, Acetal C, Polyvinylidenefluoride, PVDF Polyviylidenefluoride, PPS Polyphenylene Sulphide, PBI Polybenzimidazole, PPSU Polyphenylenesulphone, PP Polypropylene, Polyvinylchloride, PSU Polysulphone, PEI Polyetherimide, PTFE Polytetrafluoroethylene, PC Polycarbonate, or PVC Polyvinylchloride. It will be appreciated that the polymer, cylinder diameter, and wall thickness will impact the stiffness. In an exemplary embodiment using 1.75 inch OD rods, the stiffness (EI) is about $1.7 \times 10^8$ to about $2.0 \times 10^6$ lb-in$^2$.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device comprising:
a plurality of cylindrical sleeves arranged parallel to each other, each of the plurality of sleeves having an interior surface defining an interior region;
a plastically deformable rod arranged within the interior region of each of the plurality of sleeves and adapted to assume a helical shape upon compression;
an end plate, the plurality of cylindrical sleeves being fixed to the end plate at a first end; and
a stiffening member disposed substantially parallel to the plurality of cylindrical sleeves and fixed to the end plate, each rod being connected to the stiffening member.

2. The device of claim 1, wherein the surface of the interior region of each of the plurality of sleeves has a coefficient of friction of about 0.06 to about 0.45.

3. The device of claim 1, wherein the surface of the interior region of each of the plurality of sleeves comprises a polymer liner.

4. The device of claim 1, wherein each of the plurality of cylindrical sleeves is substantially fixed to each other of the plurality of cylindrical sleeves.

5. The device of claim 4, wherein each of the plurality of cylindrical sleeves is fixed by stiffeners.

6. The device of claim 4, wherein the plurality of cylindrical sleeves is overwrapped.

7. The device of claim 6, wherein the overwrap comprises fiberglass cloth.

8. The device of claim 6, wherein the overwrap comprises epoxy resin.

9. The device of claim 4, wherein the stiffeners are substantially evenly spaced along the length of the plurality of cylindrical sleeves.

10. The device of claim 1, adapted to allow free motion of the plurality of sleeves relative to the rods at an end opposite the end plate.

11. The device of claim 1, wherein the end plate is adapted to be fixed to a building.

12. The device of claim 1, the stiffening member having a substantially cruciform cross-section.

13. The device of claim 1, the stiffening member being adapted to substantially prevent yielding of the rods where attached thereto during compression.

14. The device of claim 1, each of the plurality of cylindrical sleeves having a slot therein, adapted to allow relative coaxial motion between the plurality of cylindrical sleeves and rods without obstruction by the stiffening member.

15. The device of claim 4, wherein the plurality of cylindrical sleeves has a stiffness (EI) of about $1.7 \times 10^8$ to about $2.0 \times 10^6$ lb-in$^2$.

16. The device of claim 1, the device not including a concrete exoskeleton.

17. The device of claim 1, the device not including a metal exoskeleton.

18. The device of claim 1, the plurality of cylindrical sleeves numbering from 2 to 10.

19. A method of bracing a structure, the method comprising affixing thereto a device comprising:
 a plurality of cylindrical sleeves arranged parallel to each other, each of the plurality of sleeves having an interior surface defining an interior region;
 a plastically deformable rod arranged within the interior region of each of the plurality of sleeves and adapted to assume a helical shape upon compression;
 an end plate, the plurality of cylindrical sleeves being fixed to the end plate at a first end; and
 a stiffening member disposed substantially parallel to the plurality of cylindrical sleeves and fixed to the end plate, each rod being connected to the stiffening member.

20. The method of claim 19, wherein the surface of the interior region of each of the plurality of sleeves has a coefficient of friction of about 0.06 to about 0.45.

21. The method of claim 19, wherein the surface of the interior region of each of the plurality of sleeves comprises a polymer liner.

22. The method of claim 19, wherein each of the plurality of cylindrical sleeves is substantially fixed to each other of the plurality of cylindrical sleeves.

23. The method of claim 22, wherein each of the plurality of cylindrical sleeves is fixed by stiffeners.

24. The method of claim 22, wherein the plurality of cylindrical sleeves is overwrapped.

25. The method of claim 24, wherein the overwrap comprises fiberglass cloth.

26. The method of claim 24, wherein the overwrap comprises epoxy resin.

27. The method of claim 22, wherein the stiffeners are substantially evenly spaced along the length of the plurality of cylindrical sleeves.

28. The method of claim 19, adapted to allow free motion of the plurality of sleeves relative to the rods at an end opposite the end plate.

29. The method of claim 19, wherein the end plate is adapted to be fixed to a building.

30. The method of claim 19, the stiffening member having a substantially cruciform cross-section.

31. The method of claim 19, the stiffening member being adapted to substantially prevent yielding of the rods where attached thereto during compression.

32. The method of claim 19, each of the plurality of cylindrical sleeves having a slot therein, adapted to allow relative coaxial motion between the plurality of cylindrical sleeves and rods without obstruction by the stiffening member.

33. The method of claim 22, wherein the plurality of cylindrical sleeves has a stiffness (EI) of about $1.7 \times 10^8$ to about $2.0 \times 10^6$ lb-in$^2$.

34. The method of claim 19, the device not including a concrete exoskeleton.

35. The method of claim 19, the device not including a metal exoskeleton.

36. The method of claim 19, the plurality of cylindrical sleeves numbering from 2 to 10.

* * * * *